United States Patent
Ping

(10) Patent No.: US 8,254,400 B2
(45) Date of Patent: Aug. 28, 2012

(54) USER EQUIPMENT, TELECOMMUNICATIONS SYSTEM AND MESSAGE RECOVERY METHOD

(75) Inventor: Shan-Wei Ping, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 282 days.

(21) Appl. No.: 12/714,943

(22) Filed: Mar. 1, 2010

(65) Prior Publication Data

US 2011/0211505 A1 Sep. 1, 2011

(51) Int. Cl.
*H04L 12/28* (2006.01)
*H04L 12/56* (2006.01)
*H04L 12/66* (2006.01)
*H04J 3/16* (2006.01)
*H04J 3/22* (2006.01)

(52) U.S. Cl. ......... 370/401; 370/354; 370/398; 370/467

(58) Field of Classification Search .......... 370/352–356, 370/398, 400, 401, 466, 467
See application file for complete search history.

(56) References Cited

U.S. PATENT DOCUMENTS

2008/0013549 A1 * 1/2008 Okagawa et al. ............. 370/397
* cited by examiner

*Primary Examiner* — Ronald Abelson
(74) *Attorney, Agent, or Firm* — Birch, Stewart, Kolasch & Birch, LLP

(57) ABSTRACT

A user equipment (UE) implementing a message recovery method is disclosed, supporting messages of both the circuit switched (CS) domain and the packet switched (PS) domain. The UE roams in a wireless telecommunications system and performs a call setup procedure. When the UE receives an NAS message comprising a domain identifier and a protocol discriminator, the UE determines whether the domain identifier and the protocol discriminator are of the same domain. If the domain identifier and the protocol discriminator are of the same domain, the UE proceeds with processes corresponding to the NAS message. If the domain identifier and the protocol discriminator are of different domains, the NAS message is determined to be an error message, and the UE modifies the domain identifier of the NAS message to generate a recovered NAS message, and determines whether the recovered NAS message is compatible to the call setup procedure.

16 Claims, 5 Drawing Sheets

USER EQUIPMENT, TELECOMMUNICATIONS SYSTEM AND MESSAGE RECOVERY METHOD

BACKGROUND OF THE INVENTION

1. Field of the Invention

A mobile telecommunications systems is disclosed, and in particular, to a message recovery method for a mobile device to increase call success rate.

2. Description of the Related Art

In a Universal Mobile Telecommunications System (UMTS) network, separation between the access stratum (AS) and the non-access stratum (NAS) is well defined by the Third Generation Partnership Project (3GPP) standard. FIG. 1 shows a message structure according to the 3GPP standard, presenting a layered structure as defined by the open system interconnection (OSI) model. For brevity, only relevant fields are illustrated in the message structure. A non-access stratum (NAS) message 110 is embedded in the body of the access stratum (AS) message 100, comprising certain header fields such as a core network (CN) domain identifier 112 and a protocol discriminator 114, and a message body that may further be embedded with an Internet Protocol (IP) packet 120 or other types of payloads. For example, the IP packet 120 is typically used to contain a Transmission Control Protocol (TCP) packet 130 embedded with the Hypertext Transport Protocol (HTTP) packet 140.

According to the UMTS standard, the NAS message 110 is passed between a User Equipment (UE) and the core network (not shown) through Radio Resource Control (RRC) initial/uplink/down direct transfers. The CN domain identifier 112 in the NAS message 110 is designated to provide specific information for CN domain identification. Based on the CN domain identifier 112, the UE is able to route the NAS message 110 to a proper message handler to handle the NAS message 110. Based on 3GPP specification, the domain contains at least two types, the packet switched (PS) domain, and the circuit switched (CS) domain. An NAS message 110 of the PS domain is typically used to present internet data packets, in which the protocol discriminator 114 typically contain values of GMM(0x08), SM(0x0a), GTTP(0x04) or SMS (0x09). Meanwhile, an NAS message 110 of the CS domain is generally phone call related data packets, and the protocol discriminator 114 are filled with one of the values MM(0x05), CC(0x03), SS(0x0b) and SMS(0x09).

Traffics for the PS domain and the CN domain are usually simultaneously processed if the UE supports both domains. For example, a mobile phone may be capable of surfing the internet concurrently while making a phone call. The interactions between the UE and the core network generally involve network entities such as Mobile Switching Centers (MSCs), Serving GPRS Support Nodes (SGSNs), Radio Network Controllers (RNCs) and Base Stations (BSs). Thus, sometimes the NAS message 110 may contain a CN domain identifier 112 with wrong domain values due to undeterminable reasons. The UE relies upon the CN domain identifier 112 to determine how to handle an NAS message 110 when receiving the NAS message 110. If the UE receives an NAS message 110 containing a CN domain identifier 112 of invalid value, the UE may ignore the NAS message 110. When such an error happens, a connection between the UE and the core network may fail or be disconnected, thereby degrading the service quality.

Therefore, a more robust message control mechanism is desirable.

BRIEF SUMMARY OF THE INVENTION

A user equipment (UE) is provided, supporting messages of both the circuit switched (CS) domain and the packet switched (PS) domain. The UE roams in the wireless telecommunications system and performs a call setup procedure. When the UE receives an NAS message comprising a domain identifier and a protocol discriminator, the UE determines whether the domain identifier and the protocol discriminator are of the same domain. If the domain identifier and the protocol discriminator are of the same domain, the UE proceeds with processes corresponding to the NAS message. If the domain identifier and the protocol discriminator indicate different domains, the NAS message is determined to be an error message, and the UE modifies the domain identifier of the NAS message to generate a recovered NAS message, and determines whether the recovered NAS message is compatible to the call setup procedure. If the recovered NAS message is compatible to the call setup procedure, the UE proceeds with the call setup procedure using the recovered NAS message. If the recovered NAS message is incompatible to the call setup procedure, the UE returns an error message to the source of the NAS message.

A message recovery method used in a user equipment is provided, wherein the user equipment supports messages of both the circuit switched (CS) domain and the packet switched (PS) domain in a wireless telecommunications system. In the message recovery method, a Non-Access stratum (NAS) message comprising a domain identifier and a protocol discriminator while performing a call setup procedure is received, and whether the domain identifier and the protocol discriminator are of the same domain is determined. If the domain identifier and the protocol discriminator are of the same domain, the user equipment proceeds with processes corresponding to the NAS message, and if the domain identifier and the protocol discriminator indicate different domains, user equipment assesses the NAS message as an error message, and modifies the domain identifier of the NAS message to generate a recovered NAS message.

A user equipment is provided, supporting messages of both a circuit switched (CS) domain and a packet switched (PS) domain in a wireless telecommunications system. In the user equipment, a first means receives a Non-Access stratum (NAS) message comprising a domain identifier and a protocol discriminator while performing a call setup procedure, and a second means determines whether the domain identifier and the protocol discriminator are of the same domain. A third means proceeds with processes corresponding to the NAS message if the domain identifier and the protocol discriminator are of the same domain, and a fourth means assesses the NAS message as an error message, and modifying the domain identifier of the NAS message to generate a recovered NAS message, if the domain identifier and the protocol discriminator indicate different domains.

Message recovery methods may take the form of a program code embodied in a tangible media. When the program code is loaded into and executed by a machine, the machine becomes an apparatus for practicing the disclosed method. Message recovery methods may also take any form of hardware circuit.

A message recovery method and a telecommunications system for the UE are also provided, and detailed descriptions are given with reference to the accompanying drawings in the following.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1:
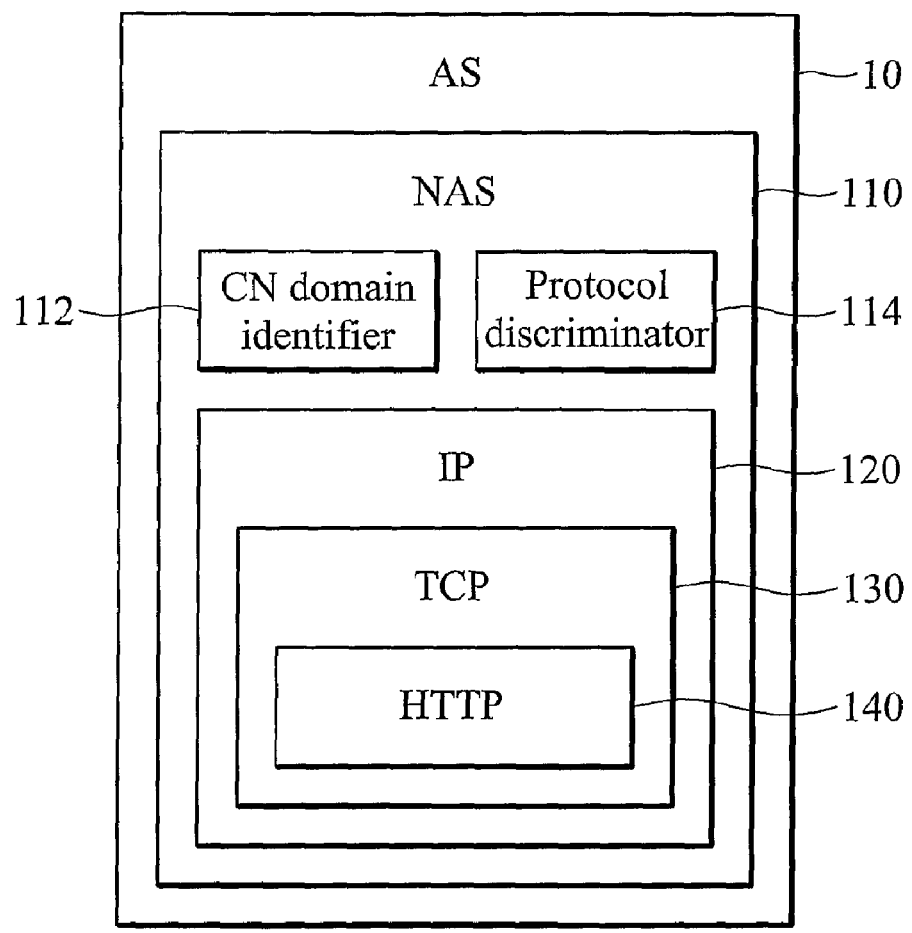
FIG. 1 shows a message structure according to the 3GPP standard.
Figure 2:
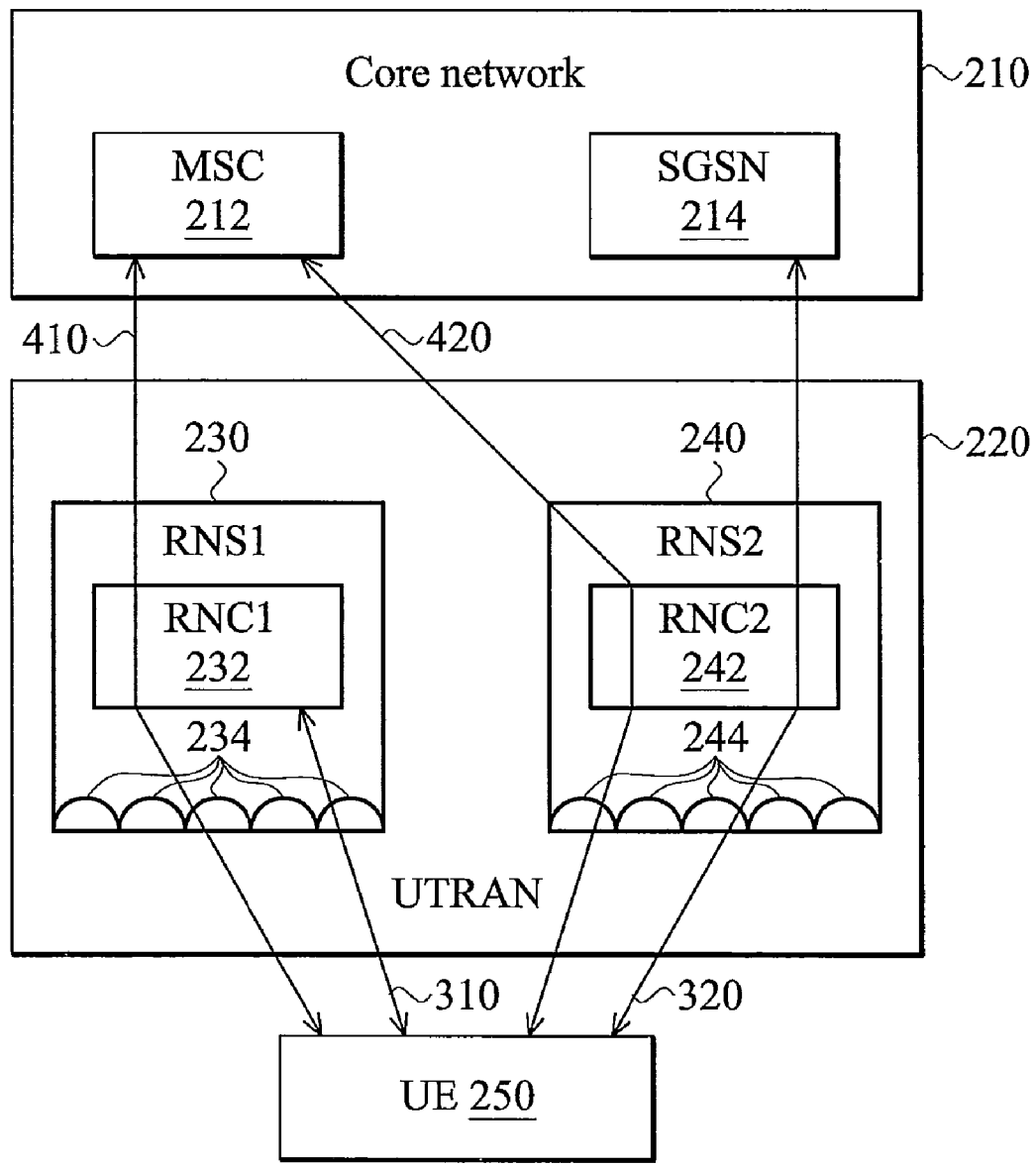
FIG. 2 shows an overall structure of a Universal Mobile Telecommunications System (UMTS).

FIG. 2 shows an overall structure of a Universal Mobile Telecommunications System (UMTS). The UMTS is typically a distributed system that can provide services to a wide range of geometric areas. A user equipment (UE) 250 is interconnected to the core network 210 through the UMTS Terrestrial Radio Access Network (UTRAN) 220. The core network 210 typically comprises one or more Message Switching Centers (MSCs) 212 and Serving GPRS Support Nodes (SGSNs) 214 distributed in different areas. The MSC 212 handles all call related traffics. The SGSN 214, according to the UMTS standard, keeps track of the location of the UE 250 and performs security functions and access control. In the UTRAN 220, a plurality of Radio Network Subsystems (RNSs) each provide transmission/reception for a group of radio cells distributed in various locations. For example, a first RNS 230 comprises a first RNC 232 and a plurality of BS nodes 234, providing radio access services covering a first area, and a second RNS 240 comprising a second RNC 242 and a plurality of BS nodes 244 provides radio access services covering a second area. In the figure, for brevity of description, the UE 250 is presumed to be in the first area, using the first RNS 230 as an SRNS for proceeding with a call setup procedure.

In FIG. 2, dialogs related to a call setup procedure and an SRNS relocation procedure are shown. Assume the UE 250 is moving from the coverage of the first RNS 230 to that of the second RNS 240, an SRNS relocation procedure will be performed to hand over the SRNS from the first RNS 230 to the second RNS 240. The related dialogs are labeled as 310 and 320. The dialogs 310 and 320 are further introduced in FIG. 3. Meanwhile, the UE 250 may perform a call setup procedure while moving between the coverage areas. The call setup related dialogs are labeled as 410 and 420, and detailed steps are described in FIG. 4.

Figure 3:
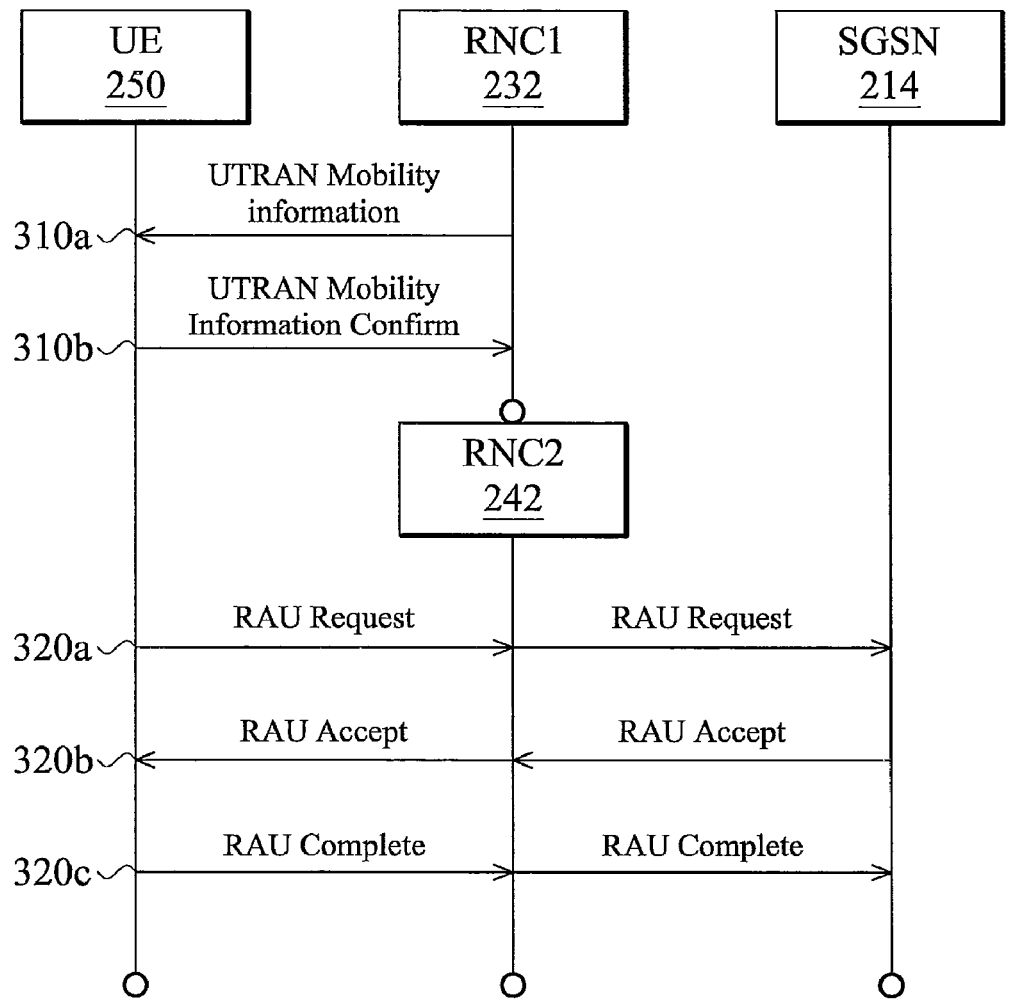
FIG. 3 shows a protocol diagram of an SRNS relocation procedure.

FIG. 3 shows a protocol diagram of an SRNS relocation procedure. When the UE 250 moves away from the coverage of first RNS 230, the SNRS relocation procedure is triggered, for example by RNC 232. Steps 310*a* and 310*b* show the dialog 310 as discussed in FIG. 2. In step 310*a*, the first RNC 232 sends a UTRAN Mobility Information request to the UE 250. In step 310*b*, the UE 250 responds to the first RNC 232 with a UTRAN Mobility Information Confirm. Thereafter, the SRNS is handed over to the second RNS 240, and further dialogs are processed with the second RNC 242. Steps 320*a*, 320*b* and 320*c* show the dialog 320 as discussed in FIG. 2, which are parts of the SRNS relocation procedure. If the routing area is changed (connect to different SGSN), an Intra-SGSN Routing Area Update procedure is performed. In step 320*a*, the UE 250 sends a Routing Area Update (RAU) request to the SGSN 214 via the second RNC 242. The RAU request is typically an NAS message 110 with its CN domain identifier 112 set to "PS-domain", hence it can be correctly routed to the SGSN 214. In step 320*b*, the SGSN 214 responds with a Routing Area Update Accept signal to the UE 250 via the second RNC 242. In step 320*c*, the UE 250 further sends a Routing Area Update Complete signal to the SGSN 214 to conclude the SRNS relocation procedure.

Figure 4:
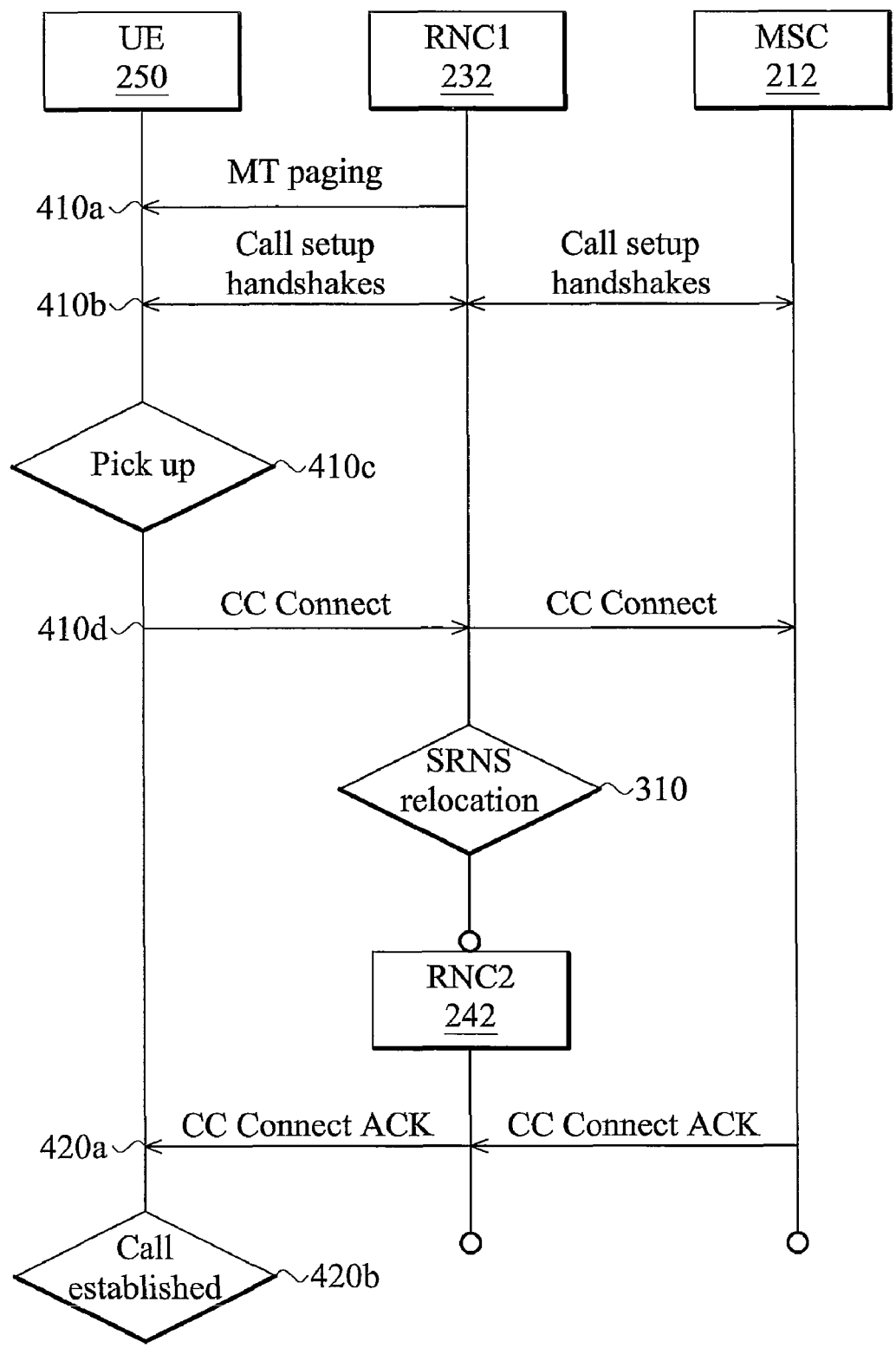
FIG. 4 shows a protocol diagram of a call setup procedure when the SRNS relocation procedure is triggered.

FIG. 4 shows a protocol diagram of a call setup procedure when the SRNS relocation procedure is triggered. In the figure, a call setup procedure is performed while the SRNS procedure is ongoing. Steps 410*a* to 410*d* show the dialog 410 as discussed in FIG. 2. In step 410*a*, the first RNC 232 initializes the call setup procedure by sending a mobile terminal (MT) paging signal to the UE 250. Thereafter, in step 410*b*, a series of handshakes between the UE 250 and MSC 212 via the first RNC 232, such as a security mode procedure and a radio bearer (RB) setup procedure are performed. Upon completion of the handshakes, in step 410*c*, a user picks up the phone, and consequently, the UE 250 initializes a call control (CC) connect signal to the MSC 212 as illustrated in step 410*d*. In the figure, the CC connect signal is an NAS message 110 with a CN domain identifier 112 and a protocol discriminator 114. For example, the value in the CN domain identifier 112 is "cs-domain", and the value in the protocol discriminator 114 is "0x83c7", a value consistent to the CS domain. Since the call setup procedure is performed while the UE 250 is moving, the SRNS relocation procedure may be performed simultaneously. For example, the dialog 310 as discussed in FIG. 2 and FIG. 3 is commenced right after step 410*d*. Consequently, the successive dialogs are performed via the second RNC 242. For example, in response to the CC connect signal delivered in step 410*d*, the MSC 212 may respond with a CC connect acknowledge signal to the UE 250 via the second RNC 242 as shown in step 420*a*. Thereby, completing the call setup procedure, wherein the UE 250 establishes a call session as shown in step 420*b*.

In step 420*a*, the CC connect acknowledge signal is an NAS message 110, comprising a CN domain identifier 112 of value "cs-domain", and a protocol discriminator 114 of value "0x030F". However, sometimes the CN domain identifier 112 of the CC connect acknowledge signal may be misplaced by a value "PS-domain". Consequently, by examining the CN domain identifier 112, the CC connect acknowledge signal is determined to be an invalid packet and dropped by the UE 250. If the CC connect acknowledge signal is dropped in step 420*a*, the call setup procedure will fail.

The disclosure proposes an error handling mechanism to prevent such potential errors, and failures. During the call setup process, while SRNS relocation is ongoing, if the core network sends an NAS message of the wrong CN domain, a recovery mechanism is implemented in the UE 250 to check if the message can be recovered to fit a current state of the UE 250. For example, if the NAS message is compatible to the current state of UE by replacing the wrong CN domain with a different one, the UE 250 would be able to proceed with the call setup procedure using the modified NAS message. Yet, if the modification of the wrong CN domain fails to generate a useful NAS message 110 compatible to the current states of the ongoing procedures, the UE 250 may implement an error notification mechanism that sends RRC Status to the core network with an error cause such as "NAS message not compatible with receiver state". Thus, the core network may determine the error and perform appropriate recovery processes instead of simply waiting for a response until a time has run out.

Figure 5:
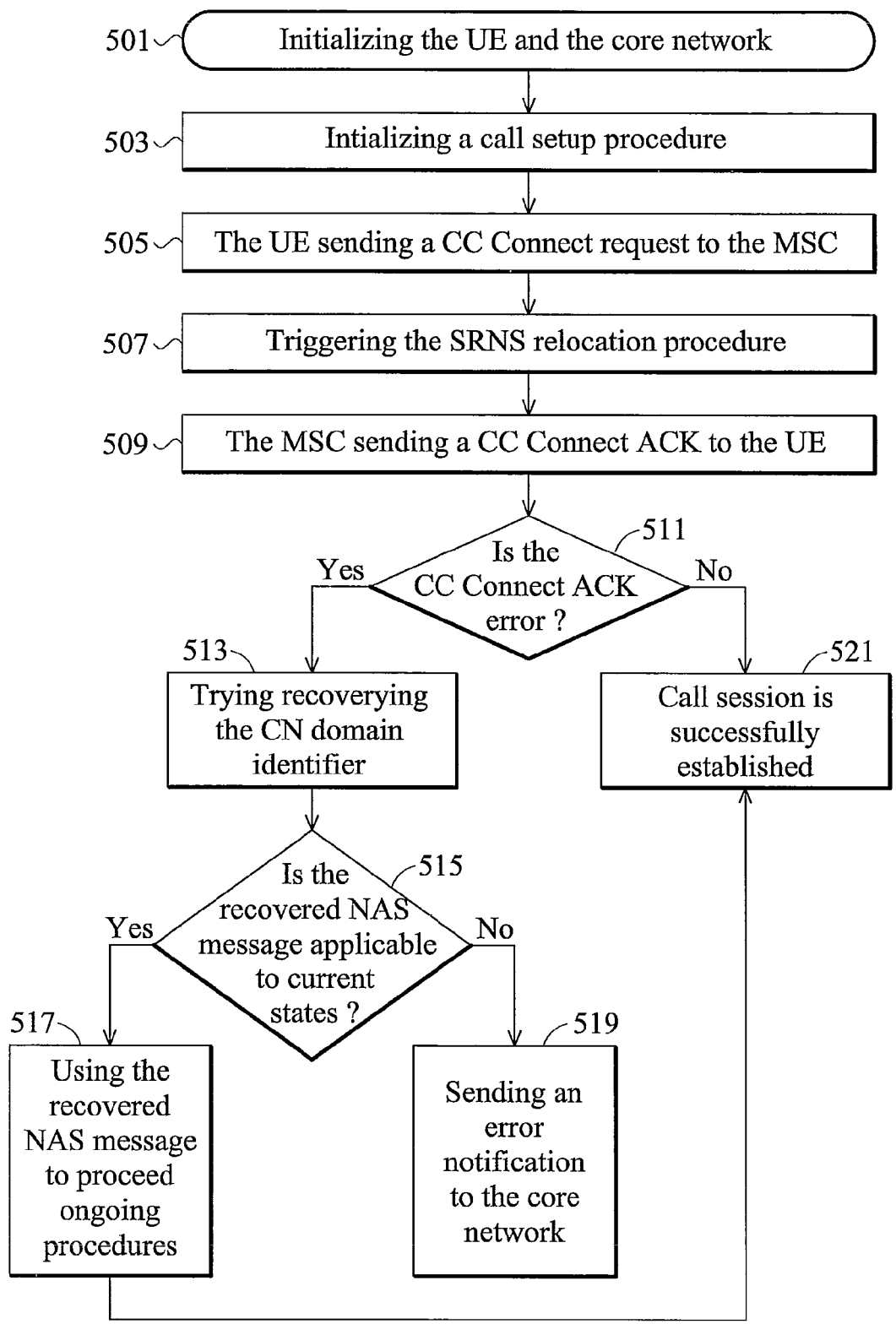
FIG. 5 is a flowchart of an exemplary message recovery method.

FIG. 5 is a flowchart of an exemplary message recovery method. The aforementioned descriptions can be summarized into the following steps. In step 501, the telecommunications system as described in FIG. 2 is initialized. In step 503, a call setup procedure is initialized by the first RNC 232 sending a request to the UE 250. In step 505, the UE 250 sends a Call Control (CC) connect request to the MSC 212 upon determination of a call in the first area. In step 507, the SRNS relocation procedure is triggered as the UE 250 reaches the coverage boundaries between the first RNS 230 and second RNS 240. In step 509, the SRNS is relocated to the second RNS 240 to serve the UE 250 in a second area, and the MSC 212 sends a CC connect acknowledge signal to the UE 250 via the second RNC 242 in response to the CC connect request signal shown in step 505. In step 511, the UE 250 determines whether a domain mismatch occurs between the domain identifier and the protocol discriminator of the CC connect acknowledge signal. If no error is determined, step 521 is processed, wherein a call session can be successfully established. Conversely, if the domain identifier and the protocol discriminator of the CC connect acknowledge signal indicate different domains, the UE 250 may perform a recovery procedure in steps 513. For example, the domain identifier may have a problematic value "PS-domain", and the UE 250 may modify it to "CS-domain" to generate a recovered NAS message. Thereafter, in step 515, the UE 250 would determine whether the recovered NAS message is compatible to the call setup procedure. For example, according to step 420a in FIG. 4, the call setup procedure is at the step where a CC connect acknowledge signal of the CS-domain is expected. In this case, the recovered NAS message meets the expectation, thus step 517 is processed, wherein the UE 250 adapts the recovered NAS message as the CC connect acknowledge signal and proceeds to step 521. However, if the recovered NAS message cannot be applied to any ongoing procedure in the UE 250, step 519 is processed, wherein the UE 250 returns an error notification to the source of the NAS message, such as the MSC 212 in the core network 210.

The recovery method can be applied to any NAS message, wherein the core network abnormally placed a wrong value in the CN domain identifier 112. The disclosure shows that the UE 250 is able to successfully complete the call setup procedure even if the NAS message is placed with a wrong CN domain value, thereby improving call success rate while SRNS relocation is ongoing.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the herein-described exemplary embodiments, but should be defined only in accordance with the following claims and their equivalents. Specifically, the present invention may be implemented within a microprocessor device which may be used in a general purpose computer.

Those skilled in the art will readily observe that numerous modifications and alterations of the device and method may be made while retaining the teachings and without departing from the spirit and scope. Accordingly, the above disclosure should be construed as limited only by the metes and bounds of the appended claims. Therefore, the scope of the appended claims should be accorded the broadest interpretation so as to encompass all such modifications and similar arrangements.

What is claimed is:

1. A wireless telecommunications system, comprising:
a user equipment, supporting messages of both the circuit switched (CS) domain and the packet switched (PS) domain in the wireless telecommunications system and performing a call setup procedure,
wherein when the user equipment receives a Non-Access Stratum (NAS) message comprising a domain identifier and a protocol discriminator, the user equipment determines whether the domain identifier and the protocol discriminator are of the same domain, and
if the domain identifier and the protocol discriminator are of the same domain, the user equipment proceeds with processes corresponding to the NAS message,
if the domain identifier and the protocol discriminator indicate different domains, the user equipment modifies the domain identifier of the NAS message to make the domain identifier indicate the same domain as the protocol discriminator, and the user equipment generates a recovered NAS message.

2. The wireless telecommunications system as claimed in claim 1, wherein the user equipment determines whether the recovered NAS message is compatible to the call setup procedure,
if the recovered NAS message is compatible to the call setup procedure, the user equipment proceeds with the call setup procedure using the recovered NAS message, and
if the recovered NAS message is not compatible to the call setup procedure, the user equipment returns an error message to the source of the NAS message.

3. The wireless telecommunications system as claimed in claim 1, further comprising a core network, controlling packet switched traffic to and from the user equipment, at least a Message Switching Center (MSC) and a Serving GPRS Support Node (SGSN), wherein:
the MSC initializes the call setup procedure by paging the user equipment; and
the SGSN tracks the location of the user equipment.

4. The wireless telecommunications system as claimed in claim 3, further comprising a Universal Mobile Telecommunications System (UMTS) Terrestrial Radio Access Network (UTRAN), serving as linking interfaces interconnecting the core network and user equipment, comprising:
a first Radio Network Subsystem (RNS), comprising a first Radio Network Controller (RNC) and a plurality of Base Station (BS) nodes, providing radio access services covering a first area; and
a second RNS, comprising a second RNC and a plurality of BS nodes, providing radio access services covering a second area; wherein the user equipment is in the first area, and the first RNS is assigned as a Serving Radio Network Subsystem (SRNS) for the user equipment to proceed with call setup procedures.

5. The wireless telecommunications system as claimed in claim 4, wherein:
during the call setup procedure, the user equipment moves from the first area to the second area and the first RNC triggers an SRNS relocation procedure to relocate the second RNS as the SRNS for the user equipment; and
the NAS message is received from the MSC through the second RNC during the SRNS relocation procedure.

6. The wireless telecommunications system as claimed in claim 5, wherein during the call setup procedure:
the user equipment sends a Call Control (CC) connect request to the MSC upon determination of a call in the first area;
when the user equipment moves to the second area, the user equipment receives the NAS message from the MSC via the second RNC, wherein the protocol discriminator indicates the CS domain while the domain identifier indicates the PS domain;
the user equipment modifies the domain identifier to the CS domain to generate the recovered NAS message, and determines whether the recovered NAS message matches a CC connect acknowledge signal that is an expected response in response to the CC connect request;
wherein if matched, the call setup procedure is proceeded using the recovered NAS message.

7. A message recovery method used in a user equipment, wherein the user equipment supports messages of both the circuit switched (CS) domain and the packet switched (PS) domain in a wireless telecommunications system, comprising:
receiving a Non-Access stratum (NAS) message comprising a domain identifier and a protocol discriminator while performing a call setup procedure;
determining whether the domain identifier and the protocol discriminator are of the same domain;
if the domain identifier and the protocol discriminator are of the same domain, proceeding with processes corresponding to the NAS message;
if the domain identifier and the protocol discriminator indicate different domains, assessing the NAS message as an error message, and modifying the domain identifier of the NAS message to make the domain identifier indicate the same domain as the protocol discriminator, and the user equipment generates a recovered NAS message.

8. The message recovery method as claimed in claim 7, further comprising:
determining whether the recovered NAS message is compatible to the call setup procedure;
if the recovered NAS message is compatible to the call setup procedure, proceeding with the call setup procedure using the recovered NAS message; and
if the recovered NAS message is not compatible to the call setup procedure, returning an error message to the source of the NAS message.

9. The message recovery method as claimed in claim 7, further comprising triggering a Serving Radio Network Subsystem (SRNS) relocation procedure while performing the call setup procedure when the user equipment moves from a first area to a second area.

10. The message recovery method as claimed in claim 7, further comprising:
using a first Radio Network Subsystem (RNS) as an SRNS to perform a call setup procedure before the user equipment moves to a second area from a first area, wherein the first RNS and a second RNS providing radio access services respectively covering the first area and the second area.

11. The message recovery method as claimed in claim 10, further comprises:
receiving the NAS message when the user equipment moves to the second area, wherein the protocol discriminator indicates the CS domain while the domain identifier indicates the PS domain; and
modifying the domain identifier to the CS domain to generate the recovered NAS message, and determining whether the recovered NAS message matches a Call Control (CC) connect acknowledge signal.

12. A user equipment, wherein the user equipment supports messages of both a circuit switched (CS) domain and a packet switched (PS) domain in a wireless telecommunications system, comprising:
a first means for receiving a Non-Access stratum (NAS) message comprising a domain identifier and a protocol discriminator while performing a call setup procedure;
a second means for determining whether the domain identifier and the protocol discriminator are of the same domain;
a third means for proceeding with processes corresponding to the NAS message if the domain identifier and the protocol discriminator are of the same domain;
a fourth means for assessing the NAS message as an error message, and modifying the domain identifier of the NAS message to make the domain identifier indicate the same domain as the protocol discriminator, and the user equipment generates a recovered NAS message, if the domain identifier and the protocol discriminator indicate different domains.

13. The user equipment as claimed in claim 12, further comprising:
a fifth means for determining whether the recovered NAS message is compatible to the call setup procedure;
a sixth means for proceeding with the call setup procedure using the recovered NAS message, if the recovered NAS message is compatible to the call setup procedure; and
a seventh means for returning an error message to the source of the NAS message, if the recovered NAS message is not compatible to the call setup procedure.

14. The user equipment as claimed in claim 12, wherein the wireless system comprises an eighth means for triggering a Serving Radio Network Subsystem (SRNS) relocation procedure while performing the call setup procedure.

15. The user equipment as claimed in claim 12, further comprising:
a ninth means for using a first Radio Network Subsystem (RNS) as an SRNS to perform the call setup procedure before the user equipment moves to a second area from a first area, wherein the first RNS and a second RNS providing radio access services respectively covering the first area and the second area.

16. The user equipment as claimed in claim 15, further comprising:
a tenth means for receiving the NAS message when the user equipment moves to the second area, wherein the protocol discriminator indicates the CS domain while the domain identifier indicates the PS domain; and
an eleventh means for modifying the domain identifier to the CS domain to generate the recovered NAS message, and determining whether the recovered NAS message matches a Call Control (CC) connect acknowledge signal.

* * * * *